United States Patent [19]
Sato et al.

[11] Patent Number: 5,196,963
[45] Date of Patent: Mar. 23, 1993

[54] ZOOM LENS DEVICE

[75] Inventors: Tokuji Sato; Kazuo Kamata; Yasuhiro Nishitani; Kiyotaka Kobayashi, all of Tokyo, Japan

[73] Assignee: Fuji Photo Film Co., Ltd., Kanagawa, Japan

[21] Appl. No.: 855,052

[22] Filed: Mar. 18, 1992

[30] Foreign Application Priority Data

Mar. 18, 1991 [JP] Japan .................................. 3-78447
Mar. 25, 1991 [JP] Japan .................................. 3-84795
Mar. 25, 1991 [JP] Japan .................................. 3-84796

[51] Int. Cl.$^5$ ............................................. G02B 15/14
[52] U.S. Cl. .................................... 359/699; 359/700; 359/822; 359/697; 354/400
[58] Field of Search ............... 359/694, 696, 697, 698, 359/699, 700, 701, 703, 704, 705, 706, 819, 822, 823, 825; 354/195.12, 286, 400, 403, 409

[56] References Cited

U.S. PATENT DOCUMENTS

| | | | |
|---|---|---|---|
| 4,697,891 | 10/1987 | Kawai | 359/696 |
| 4,735,494 | 4/1988 | Makino et al. | 359/694 |
| 4,822,153 | 4/1989 | Tomori et al. | 359/700 |
| 4,848,884 | 7/1989 | Enomoto | 359/696 |
| 4,936,664 | 6/1990 | Haraguchi et al. | 359/697 |
| 4,993,815 | 2/1991 | Yamazaki et al. | 359/699 |
| 5,060,001 | 10/1991 | Kaneda | 354/400 |

Primary Examiner—Loha Ben
Attorney, Agent, or Firm—Young & Thompson

[57] ABSTRACT

A movable lens barrel contains a front lens group and a rear lens group and moves along the optical axis during zooming. The front lens group moves together with the movable lens barrel during zooming, and moves relative to the movable lens barrel along the optical axis during focussing. The rear lens group moves within and relative to the movable lens barrel during zooming. A deviation of the focussing position takes place due to backlash of the drive mechanism of the movable lens barrel. This focussing position deviation is eliminated by changing the position of the front lens group as set for focussing, or by changing the position of the rear lens group as set for zooming, respectively in accordance with the zooming direction. In order to determine the set position of the front lens group, two tables are provided corresponding respectively to the zooming direction. Each table stores a plurality of lens setting positions, an optimum one of which is selected in accordance with the focal length and subject distance. In order to adjust the position of the rear lens group, two types of cam surfaces are provided which are selectively used in accordance with the zooming direction. In another embodiment, a double cam ring is provided which is rotated during zooming to determine the position of the rear lens group. Only immediately after the zooming direction changes, the double cam ring is slid along the optical axis by a predetermined amount.

28 Claims, 17 Drawing Sheets

FIG. 6

| WIDE → TELE LENS POSITION (mm) | | | |
|---|---|---|---|
| FOCAL LENGTH (mm) / SUBJECT DISTANCE (m) | 68 | 50 | 36 |
| 8 | 9.31 | 11.51 | 14.58 |
| 3 | 9.58 | 11.63 | 14.74 |
| 0.8 | 10.13 | 12.23 | 15.50 |

FIG. 7

| TELE → WIDE LENS POSITION (mm) | | | |
|---|---|---|---|
| FOCAL LENGTH (mm) / SUBJECT DISTANCE (m) | 68 | 50 | 36 |
| 8 | 9.01 | 11.21 | 14.28 |
| 3 | 9.28 | 11.33 | 14.44 |
| 0.8 | 9.83 | 11.93 | 15.20 |

ZOOM LENS DEVICE

BACKGROUND OF THE INVENTION

1. Field of the Invention

The present invention relates to a zoom lens device for a camera, and more particularly to a zoom lens device capable of preventing the focal point from deviating under the influence of backlash of the zooming mechanism.

2. Related Background Art

Almost all recent compact cameras have a built-in zoom lens device. A two-group type optical system of the zoom lens is widely used in order to make the total length of the lens short and to make the camera compact. The two groups are a front lens group and a rear lens group. The front lens group has a variable power and focussing function, and the rear lens group has the function of compensating for deviation of the focal point upon moving the front lens group. During zooming, a movable lens barrel containing the front lens group and the rear lens group moves along the optical axis, and at the same time, the rear lens group moves within the movable lens barrel to change the distance between the front and rear lens groups. During focussing, only the front lens group moves within the movable lens barrel by an amount corresponding to the subject distance. Therefore, the position of the rear lens group is determined by the focal length, while the position of the front lens group is determined by the focal length and the subject distance.

As lens moving mechanisms, a cam mechanism and a helicoid mechanism are known. These mechanisms give rise to mechanical backlash, which shifts or causes to deviate the position of the movable lens barrel along the optical axis or slants it relative to the optical axis. Therefore, the subject distance to be focussed changes with the direction of movement, i.e. the zooming direction, of the movable lens barrel. In order to maintain the same conditions of the movable lens barrel irrespective of its zooming direction, the mechanical backlash should be kept as small as possible. However, this requires high precision machining operations, leading to high cost.

To reduce the influence of mechanical backlash of two members constituting the cam mechanism or the helicoid mechanism, the movable member is biased by a spring. When the movable member moves in the direction opposite to the spring force, a large force is necessary so that a motor of high power is required, resulting in high cost and an increase in battery consumption. A unidirectional approach method has been proposed (U.S. Pat. No. 4,936,664) in which without using a spring, the optical system is stopped at the end of movement in only one direction. More specifically, if the optical system moves in a first zooming direction (e.g., from telephoto to wide-angle), the optical system approaches directly and is stopped at a predetermined zoom position. However, if the optical system moves in the other zooming direction (from wide-angle to telephoto), the optical system slightly overruns a predetermined zoom position, and thereafter approaches and stops in this predetermined zoom position by movement in the first zooming direction. In the latter case, an operator senses a strange time delay of stopping of the lens system, after manipulation of a zooming operation lever. In addition, if the taking zoom lens and zoom finder are driven by a single motor, the finder magnification factor differs more or less from what the operator intended.

OBJECTS OF THE INVENTION

It is a principal object of the present invention to provide a zoom lens device capable of preventing the focus from being changed by movement in either zooming direction, by compensating for the influence of backlash on the zooming mechanism.

It is another object of the present invention to provide a zoom lens device allowing rapid zooming.

It is a further object of the present invention to provide a zoom lens device of simple structure and low cost.

SUMMARY OF THE INVENTION

The above and other objects of the invention can be achieved by positioning a first lens group in a lens position corresponding to the subject distance and zooming direction, during focussing, or positioning a second lens group in a lens position corresponding to the focal length and zooming direction, during zooming, in consideration of the backlash of the zooming mechanism.

According to a preferred embodiment, there are provided a first table for a first zooming direction and a second table for the other or second zooming direction. Each table stores a plurality of lens position data specific to combinations of subject distances and motion amount data as to the movable lens barrel. During focussing, one of the tables is selected in accordance with the zooming direction, and an optimum lens position is determined in accordance with the amount of movement of the movable lens barrel and the subject distance. After selecting the optimum lens position, the first lens group is driven by a focussing motor and set to the optimum lens position. This embodiment can be readily practiced since the zoom lens drive mechanism needs no modification. Furthermore, the use of two tables results in only a low production cost.

According to another preferred embodiment, two cam surfaces are provided, one of which is selected during zooming, in accordance with the zooming direction, to control the position of the second lens group. More specifically, a rack is disposed in parallel with the motion direction of the movable lens barrel, with a pinion gear in mesh therewith. This pinion gear is rotatably mounted on a movable lens barrel, and coupled via a friction clutch plate to an actuating lever. The actuating lever swings as the pinion gear rotates, and causes a cam follower pin mounted on the pinion gear to come into contact with one of the two cam surfaces. A pin of a lens holder holding the second lens group is contacted by the actuating lever to move the second lens group along the optical axis. With this embodiment, backlash of the zooming mechanism is compensated during zooming, thus providing easy focussing.

According to another preferred embodiment, a cam ring is housed within a movable lens barrel for rotation and sliding along the optical axis. This cam ring causes the lens holder holding the second lens group to move along the optical axis. Only immediately after the zooming direction is changed, the cam ring moves along the optical axis by a predetermined amount to compensate for backlash of the zooming mechanism. During zooming, the cam ring rotates during zooming to move the lens holder along the optical axis, following the shape of the cam surface.

According to the present invention, the shift of focal point caused by backlash of the zooming mechanism can be readily compensated. Furthermore, the zooming motor can be stopped at once, providing rapid zooming.

BRIEF DESCRIPTION OF THE DRAWINGS

The above and other objects and advantages of the present invention will become apparent from the following detailed description of preferred embodiments when read in connection with the accompanying drawings, in which:

FIG. 6 is a table of lens position data of the front lens group for zooming in the telephoto direction;

FIG. 7 is a table of lens position data of the front lens group for zooming in the wide-angle direction;

DETAILED DESCRIPTION OF THE PREFERRED EMBODIMENTS

Figure 1:
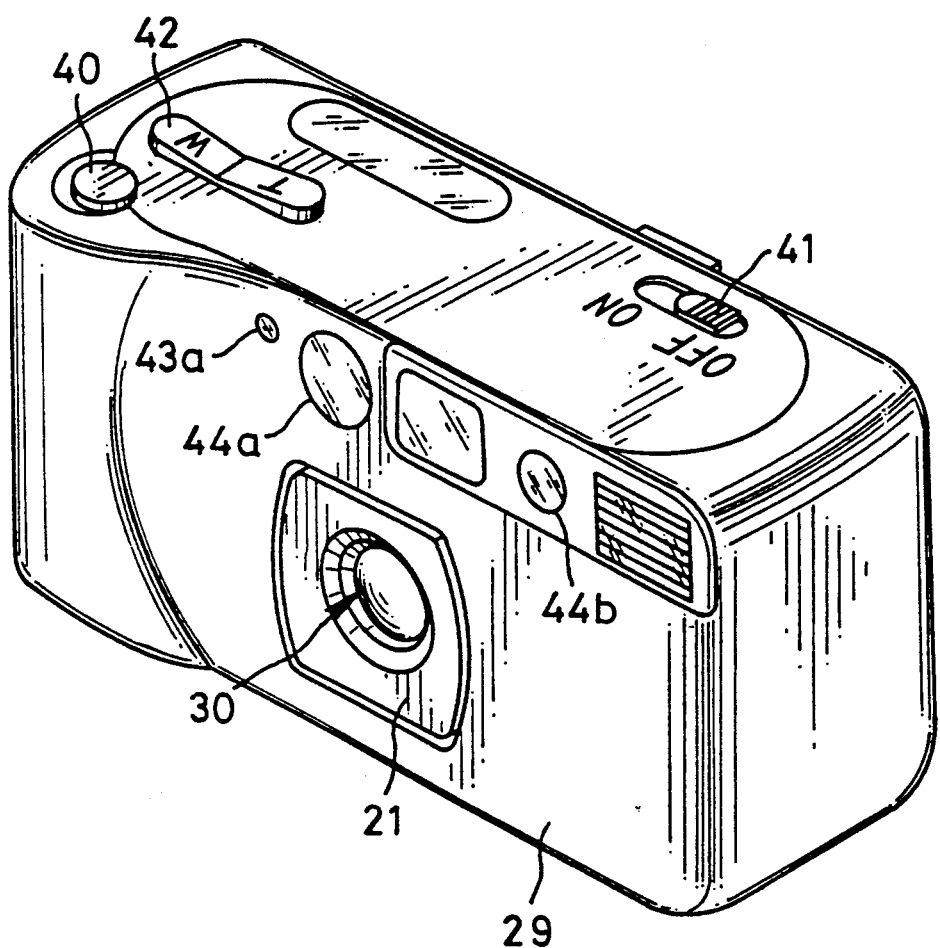
FIG. 1 is a perspective view of a compact camera having a zoom lens device of the present invention.

Referring to FIG. 1 showing a compact camera having a zoom lens device, a movable lens barrel 21 is retracted or collapsed within a camera body 29 when it is not used. When the camera is used, a main switch button 41 is slid to the ON position. The movable lens barrel 21 is thereby extended to a wide-angle end position slightly protruding from the camera body 29. Upon depression of the "T" end of a seesaw-type zooming operation lever 42, the movable lens barrel 21 is further extended from the camera body 29 to a telephoto end position, or long focal length. In this telephoto state, upon depression of the "W" end of the zooming operation lever 42, the movable lens barrel 21 retracts within the camera body 29 to the wide-angle end position, or short focal length position. When the main switch button 41 is slid to the OFF position, the movable lens barrel 21 is fully retracted within the camera body 29.

Upon half-depression of a shutter button 40, infrared light is projected through a light projecting window 44a to the subject to measure the subject distance by means of optical triangulation. The infrared ray reflected from the subject falls on a light-receiving window 44b. The subject brightness is measured through a photometry window 43a. Upon full depression of the shutter button 40, a front lens group 30 within the movable lens barrel 21 moves along the optical axis to be set to the in-focus position. After this, the shutter is actuated to make the exposure.

Figure 2:
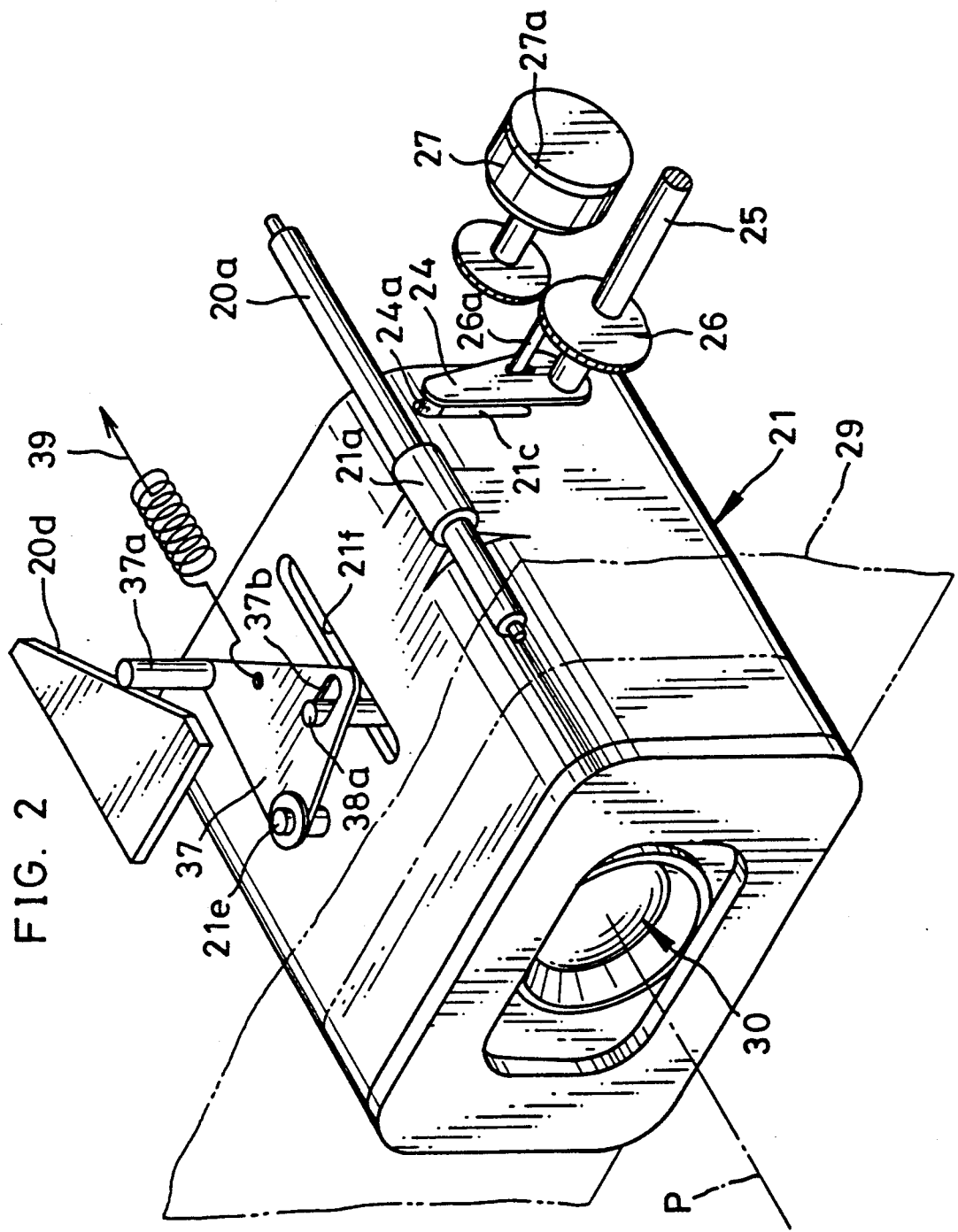
FIG. 2 is a perspective view of the zoom lens assembly thereof.
Figure 3:
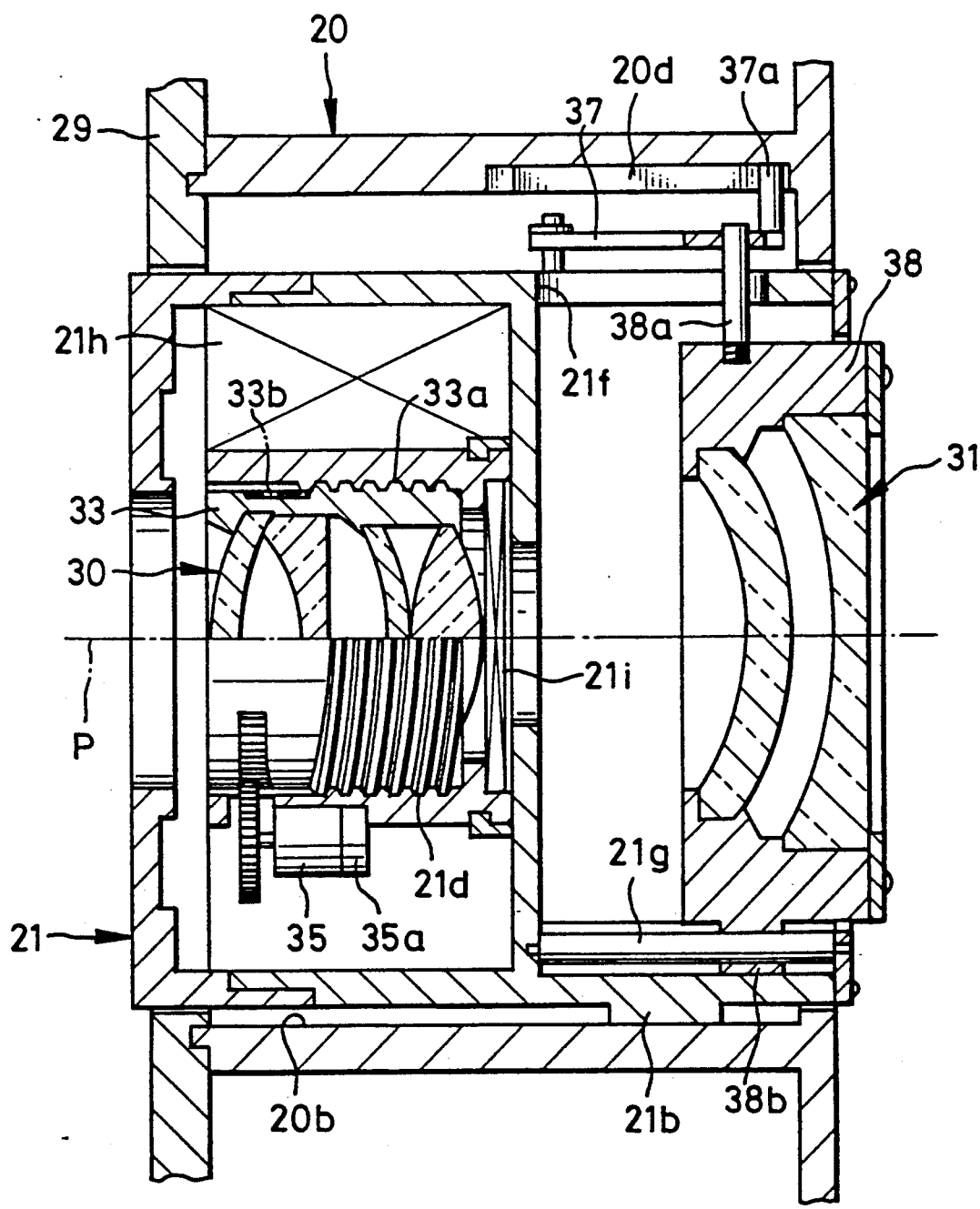
FIG. 3 is a cross sectional view of this zoom lens assembly.

Referring to FIGS. 2 and 3 showing the zoom lens assembly, the movable lens barrel 21 is slidably housed within a stationary lens barrel 20. A bearing member 21a and a projection 21b are formed on the movable lens barrel 21, which engage with a guide rod 20a and a guide groove 20b, respectively, mounted inside the stationary barrel 20 in parallel with the optical axis P. An elongated hole 21c is formed in the side wall of the movable lens barrel 21, a pin 24a mounted on a lever 24 passing through the hole 21c. This lever 24 is rotatably mounted on a shaft 25 supported by the stationary barrel 20. A sector gear 26 is fixedly mounted on the shaft 25. A pin 26a fixedly mounted on the sector gear 26 fits in an elongated hole formed in the lever 24, allowing the lever 24 to rotate as the sector gear 26 rotates. Rotation of a zooming motor 27 is transmitted via a drive gear to the sector gear 26. By this zooming motor 27, the movable lens barrel 21 is moved forward and backward relative to the stationary barrel 20 along the guide rod 20a and guide groove 20b. Reference numeral 27a represents a rotary encoder mounted coaxially with the rotor of the zooming motor 27, the encoder generating one pulse each time the zooming motor 27 rotates by a predetermined amount.

The zoom lens optical system is comprised by a front lens group 30 having a variable power and focussing function and a rear lens group 31 having the function of compensating for shift of focal point at a variable power. A lens holder 33 holds the front lens group 30, a male helicoidal thread 33a and a gear 33b being formed on the outer periphery thereof. The male helicoidal thread 33a meshes with a female helicoidal thread 21d fixedly mounted on the movable lens barrel 21. The drive power of a focussing motor 35 is transmitted via a drive gear to the gear 33b of the lens holder 33. The focussing motor 35 causes the lens holder 33 to move along the optical axis P within the movable lens barrel 21 during focussing, and moves with the movable lens barrel 21 during zooming. Reference numeral 35a represents a rotary encoder for detecting the rotary position of the focussing motor 35. Reference numeral 21h represents a shutter controller for controlling shutter blades 21i of a between-the-lens shutter.

Mounted on the inner wall of the stationary barrel 20 is a cam plate for moving the rear lens group 31 during zooming, the cam plate having at its end face a sloped cam surface 20d. An actuating lever 37 is urged by a spring 39 in a direction such that a cam follower pin 37a always remains in contact with the cam surface 20d. The actuating lever 37 rotates according to the shape of the cam surface 20d and moves along the optical axis P, using as a fulcrum a shaft 21e mounted on the outer surface of the movable lens barrel 21. A pin 38a mounted on the outer surface of a lens holder 38 supporting the rear lens group 31 is fitted in an elongate hole 37b formed in the actuating lever 37 through a slot 21f through the movable lens barrel 21. A guide rod 21g mounted within the movable lens barrel 21 is received by a bearing member 38b of the lens holder 38, so that the lens holder 38 moves along the optical axis P as the actuating lever 37 rotates.

Figure 4:
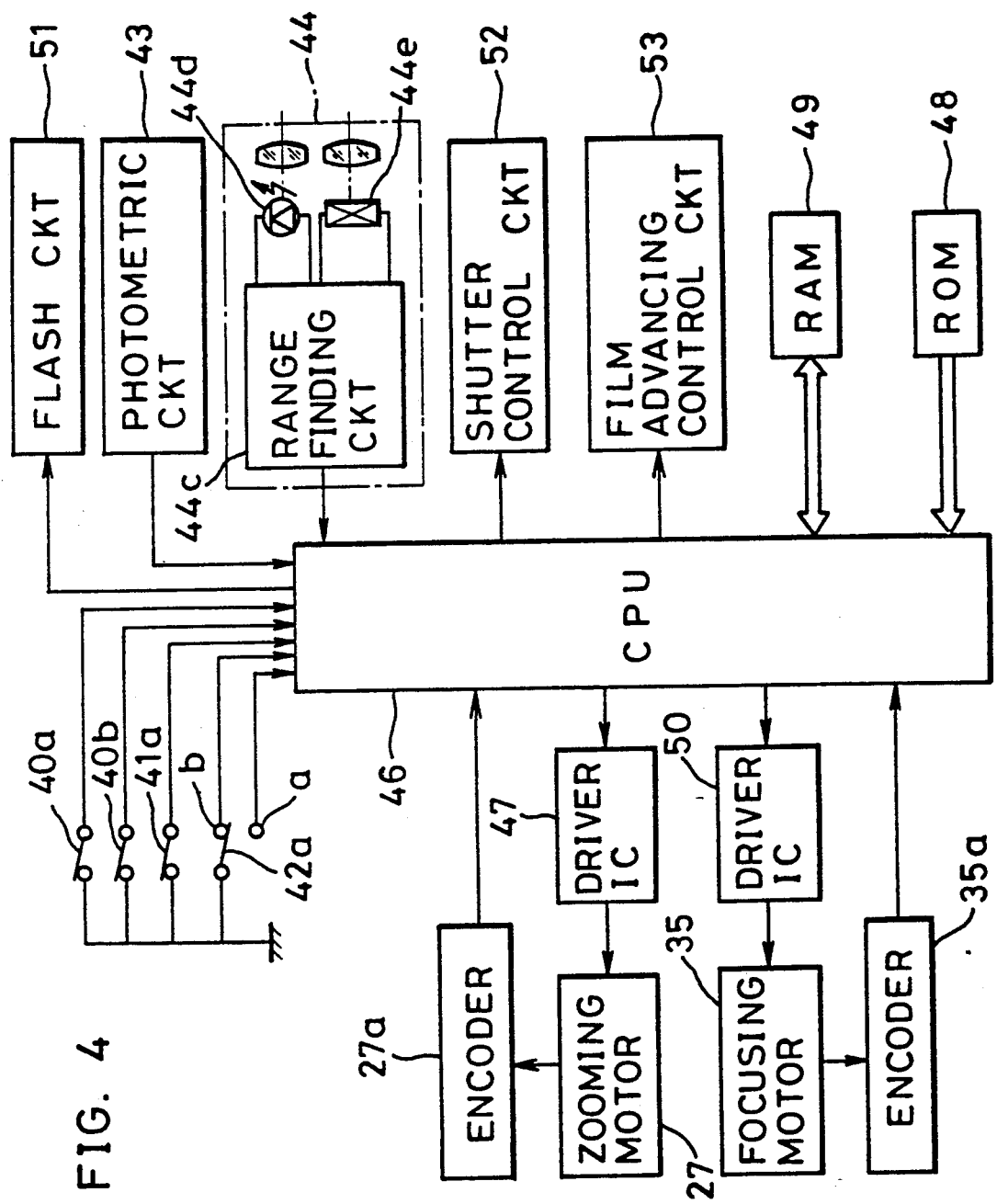
FIG. 4 is a block diagram showing the electric circuit arrangement of the compact camera shown in FIG. 1.

Referring to FIG. 4 showing the electric circuit arrangement of the compact camera, a switch 40a turns on when the shutter button 40 is half depressed, and a switch 40b turns on when it is fully depressed. When the main switch button 41 is slid to the ON position, the main switch 41a turns on to power electrical components and to extend the movable lens barrel 21 to the wide-angle end position. When the zooming operation lever 42 is set to the wide-angle side, the movable contact of the zooming switch 42a is connected to a contact a, and when it is set to the telephoto side, the movable contact is connected to a contact b. A CPU 46 operates such that when the contact a of the zooming switch 42a takes a ground potential, the zooming motor 27 is rotated in the reverse direction by a driver IC 47, and when the contact b takes a ground potential, it is rotate din the normal direction by the driver IC 47. The zooming lever 42 returns to a neutral position at the end of its manipulation to stop the zooming motor 27. CPU 46 counts pulses sent from the rotary encoder 27a to detect the position of the movable lens barrel 21, i.e., the focal length of the zoom lens optical system. CPU 46 also detects the movement direction of the movable lens barrel 21, i.e., the zooming direction, from the state of the zooming switch 42a. CPU 46 also counts pulses from the rotary encoder 35a to detect the lens position of the front lens group 30.

CPU 46 has A/D converters, interface, and the like as well known. In accordance with sequence programs stored in a ROM 48, the CPU sequentially controls a rangefinding unit 44, driver ICs 47 and 50, a flash circuit 51, a shutter control circuit 52 within a program shutter unit 21h, a film advancing control circuit 53, and other circuits. A RAM 49 stores subject brightness information, subject distance information from the rangefinding unit 44, focal length information on the zoom lens optical system, zooming direction information, and the like.

An infrared light emission diode (IRED) of the rangefinding unit 44 emits infrared light which is projected via the light projecting window 44a toward the subject. The infrared ray reflected from the subject passes through a filter (not shown) allowing only infrared light to pass, the light-receiving window 44b, and a lens, and falls on a position sensing detector (PSD) 44e. The PSD 44e generates two channel signals having different levels corresponding to the position and intensity of the incident light. The rangefinding circuit 44c detects the subject distance from the two channel signals.

The zoom lens device is assembled in such a focus adjustment that it is focussed at infinity in the wide-angle and telephoto end positions. The movable lens barrel 21 arrives a different position even with the same amount of rotation of the zooming motor 27, depending on the direction of movement, due to the backlash of the elongated hole 21c and pin 24a constituting the cam mechanism and that of the gear train. Therefore, even if the front lens group is set to a lens position within the movable lens barrel 21 suitable for the subject distance, the focal point of the zoom lens system shifts from the film surface to be exposed, by an amount that depends on the zooming direction.

Figure 5:
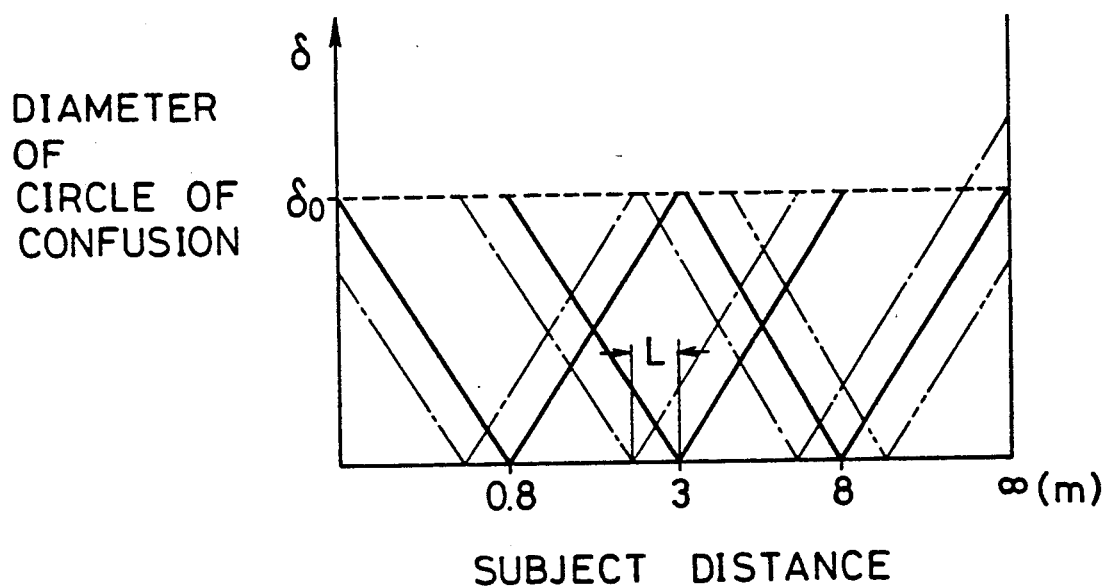
FIG. 5 is a graph showing the relation between the subject distance and the circle of confusion.

FIG. 5 illustrates an out-of-focus state in three-zone focussing at 0.8 m, 3 m and 8 m of a subject distance to be focussed. As indicated by a solid line, the rotation amount of the focussing motor 35 is determined so as to obtain proper focussing of a subject for the case of zooming from the wide-angle mode to the telephoto mode. In this example, for the case of zooming from the telephoto mode to the wide-angle mode, although the front lens group 30 has the same home position within the movable lens barrel 21, the distance from the image forming plane (photographic film surface) is shifted by a certain amount. This positional deviation changes the subject distance to be focussed, as indicated by a one-dot chain line. For example, an L m deviation in the near distance direction occurs for the subject at 3 m. If a subject is at 0.8 m, or 3 m, there is no practical problem. However, if a subject is at 8 m, the diameter $\delta_0$ of the circle of confusion is exceeded, so that blurring in the background becomes conspicuous. In order to compensate for the deviation of the lens position generated for the case of zooming from the telephoto mode to the wide-angle mode, the position of the front lens group 30 is slightly deviated in the far distance direction to obtain a proper focus of a subject irrespective of the zooming direction.

As shown in FIGS. 6 and 7, in order to compensate for mechanical backlash and obtain proper focussing, ROM 48 stores two tables for the two zooming directions. In this embodiment, focal lengths are used as the standard for the amount of movement of the front lens group 30. Instead of storing the focal lengths, the amount of rotation of the zooming motor 27, or the position of the movable lens barrel 21 or the like may also be used. From these tables, an optimum lens position can be read using the subject distance as an X address and the focal length as a Y address. The selected optimum lens position is temporarily written in RAM 49, and the front lens group 30 is set to the optimum lens position in response to a shutter release. The focal length continuously changes from the wide-angle end position to the telephoto end position. However, for the purpose of simplicity, only three focal lengths, namely 36 mm, 50 mm and 68 mm are shown in FIGS. 6 and 7. The lens position of the front lens group 30 is represented by a distance to the rear lens group 31.

Figure 8:
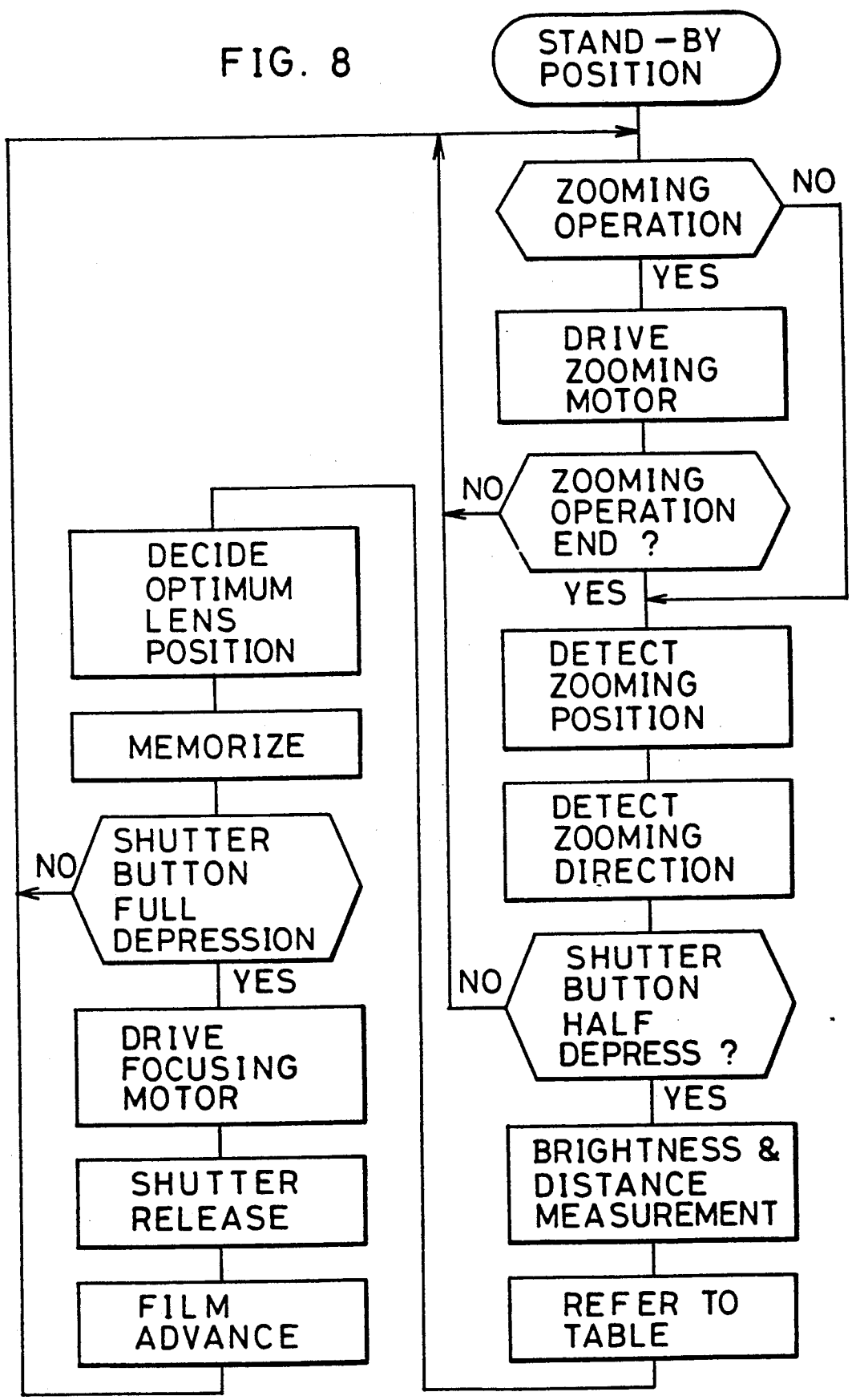
FIG. 8 is a flow chart showing sequences to be executed by the CPU.

Next, the operation of this embodiment will be briefly described with reference to FIG. 8. When the main switch button 41 is set to the ON position, the movable lens barrel 21 extends from within the camera body to the wide-angle end position. When the seesaw zooming lever 42 is actuated to make the focal length longer, the movable contact of the zoom switch 42a contacts with the fixed contact b to set it at ground potential. In accordance with this state of the zoom switch 42a, CPU 46 causes the zooming motor 27 to rotate in the normal direction, and the movable lens barrel 21 to extend farther, from the wide-angle end position to the telephoto end position. If the movable lens barrel 21 is moved backward from the telephoto end position to the wide-angle end position, the movable contact of the zoom switch 42a is connected to the fixed contact a.

As the movable lens barrel 21 moves along the optical axis P during zooming, the lens holder 33 holding the front lens group 30 moves together with the movable lens barrel 21. As the movable lens barrel 21 moves, the cam follower pin 37a moves in contact with the cam surface 20d, so that the actuating lever 37 rotates about the shaft 21e. Rotation of the actuating lever 37 is converted into a linear movement along the optical axis P by the cam mechanism including the elongated hole 37b, pin 38a and slot 21f, and transmitted to the lens holder 38. The lens holder 38 then moves relative to the linearly moving movable lens barrel 21 within it. As a result, during zooming, the movable lens barrel 21 causes the front and rear lens groups 30 and 31 to move for changing the focal length. AT this time, shift of focal point by zooming is corrected by adjusting the distance between the front and rear lens groups 30 and 31 by means of the cam mechanism.

The amount of movement of the movable lens barrel 21 during zooming, i.e., as the focal length is changed, is measured by counting pulses outputted from the rotary encoder 27a under control of CPU 46. In accordance with, which of the contacts a and b of the zooming switch 42a takes a ground potential, CPU 46 detects the zooming direction. After actuation of the zooming operation lever 42, the amount of movement (focal length) of the movable lens barrel 21 and the zooming direction are stored in RAM 49.

Upon half-depression of the shutter button 40 after zooming, the switch 40a turns on to start the photometry sequence and rangefinding sequence of CPU 46. The photometric circuit 43 measures the subject brightness using the light-receiving element disposed at the back of the photometry window 43a. The rangefinding unit 44 drives IRED 44d to radiate infrared light to the subject, and receives the reflected light at PSD 44e. The rangefinding circuit 44c calculates the subject distance from the two channel signals from PSD 44e. CPU 46 receives the subject brightness information from the photometric circuit 43 and the subject distance information from the rangefinding circuit 44c, and writes them into RAM 49.

CPU 46 calculates an exposure value using the subject brightness, and writes it in RAM 49. CPU 46 also selects one of the two tables stored in ROM 48 in accordance with the zooming direction. Then, CPU 46 selects an optimum lens position of the front lens group 30 from the selected table in accordance with the focal length and subject distance, and writes them in RAM 49.

Upon full-depression of the shutter button 40, CPU 46 reads from RAM 49 the optimum lens position, and causes the focussing motor 35 to rotate to move the front lens group 30 from the home position, e.g., a position for focussing a subject at 8 m, to the optimum lens position. The new position of the front lens group is confirmed from the number of pulses in the rotary encoder 35a. After focussing, the shutter control circuit 52 drives the shutter blades 21i to record an image of the subject on a photographic film. If the subject brightness is low, the flash circuit 51 operates to apply flash light to the subject. After photographing, the film advancing control circuit 53 operates to wind up the photographic film by one frame. At this time, the focussing motor 35 rotates in the reverse direction to return the front lens group to the home position. Returning the front lens group 30 always to the home position, results in only one direction of movement of the front lens group 30 during focussing. Therefore, the influence of backlash of the helicoid structure on the lens holder 33 can be eliminated. If the deviation of the front lens group 30 by this backlash can be neglected, the front lens group 30 may be set to the new lens setting position from the previous lens setting position, without returning it to the home position.

In the above embodiment, the position of the front lens group 30 is adjusted. If the focal length is set to two or three predetermined Values, the influence of backlash of the zooming mechanism can be eliminated by changing the stop position of the movable lens barrel 21 in accordance with the zooming direction. Furthermore, as shown in FIG. 5, even if the focussing distance when the subject distance is 0.8 m and 3 m becomes a nearer distance, it is within the diameter $\delta_0$ of the circle of confusion, so there is no practical problem. In view of this, for the subject distances of 0.8 m and 3 m, the lens setting position need not be adjusted, and the lens setting position for the subject distance only at 8 m need be adjusted. In this case, four kinds of lens setting positions are required, thus reducing the memory capacity of the ROM. Furthermore, although three-zone focussing has been described above, the lens setting positions may be increased to perform finer focussing. Still further, without writing lens setting positions in the ROM, they may be obtained from calculation. In this case, a calculation equation including a correction term for correcting the lens setting position and a calculation equation without the correction term are stored in the ROM, and one of the two calculation equations is selected in accordance with the zooming direction.

In the above embodiment, the lens position of the front lens 30 is changed to compensate for a shift of focal point caused by the change in zooming direction. Instead, the position of the rear lens group 31 may be adjusted during zooming in accordance with the zooming direction. With such an arrangement, the lens position of the front lens group 30 need not be changed with the zooming direction, so only one table will suffice.

Figure 9:
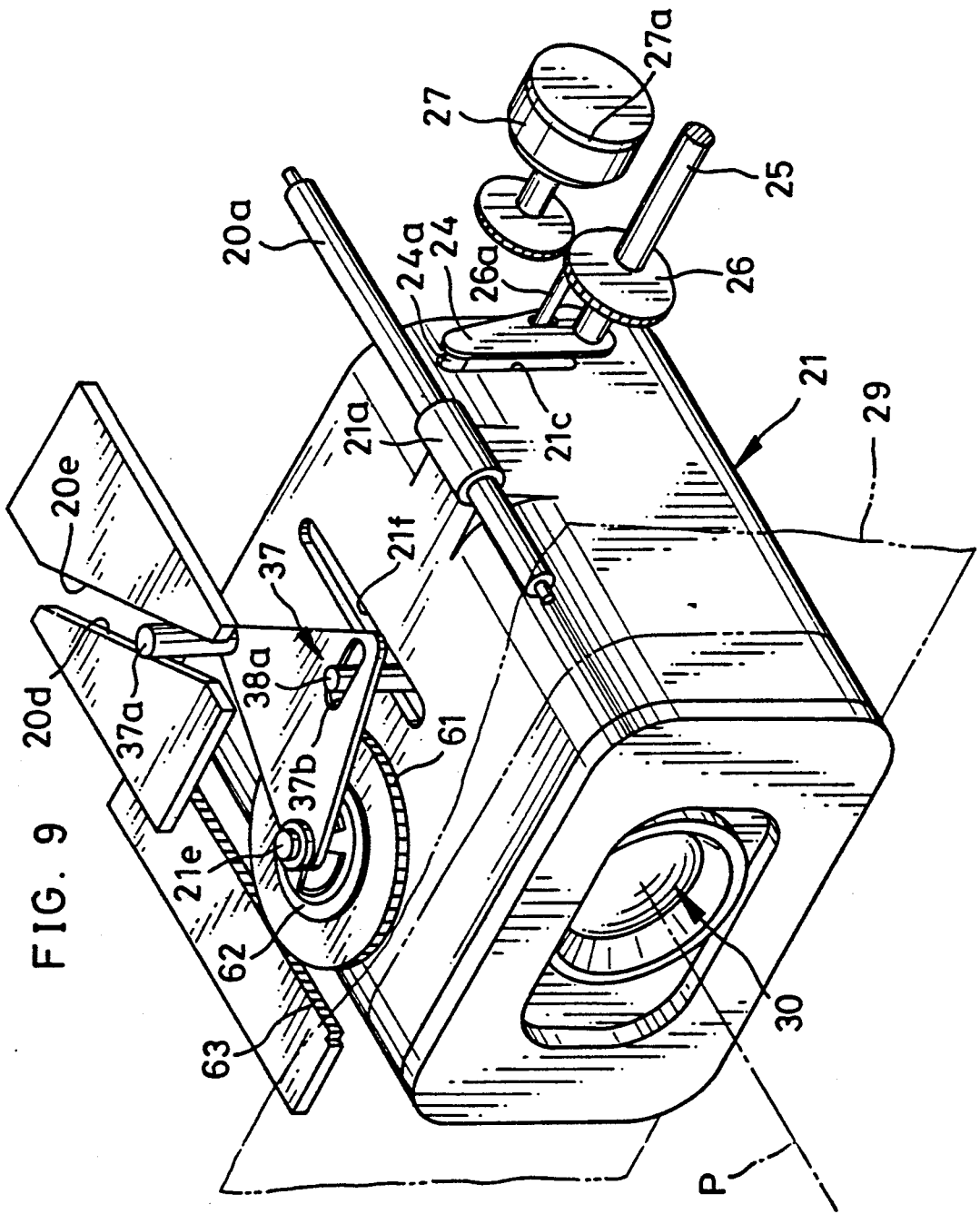
FIG. 9 is a perspective view of a zoom lens assembly according to another embodiment of the present invention, in which the shift of focal point is eliminated by adjusting the position of the rear lens group during zooming.
Figure 10:
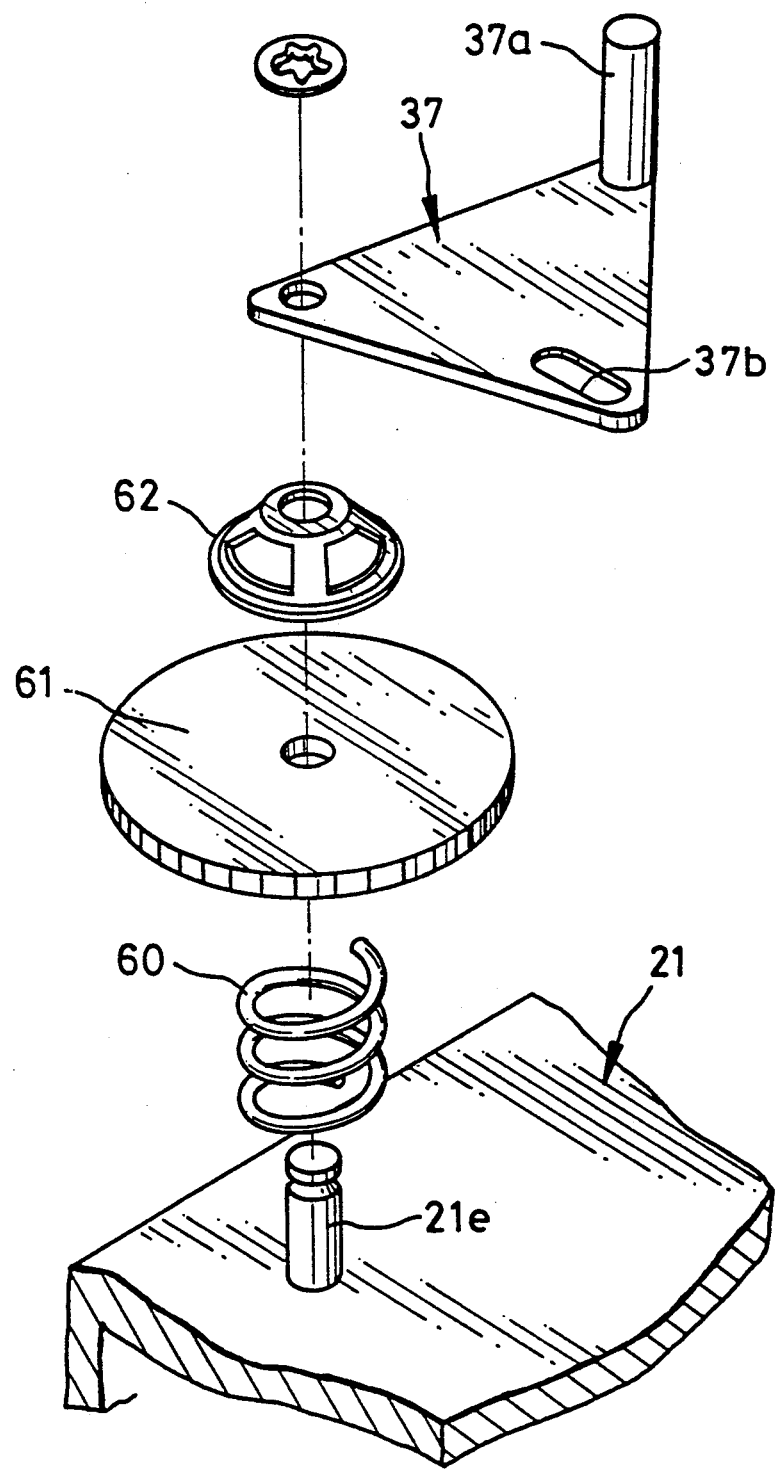
FIG. 10 is a fragmentary exploded perspective view of the friction clutch of the actuating lever.
Figure 11:
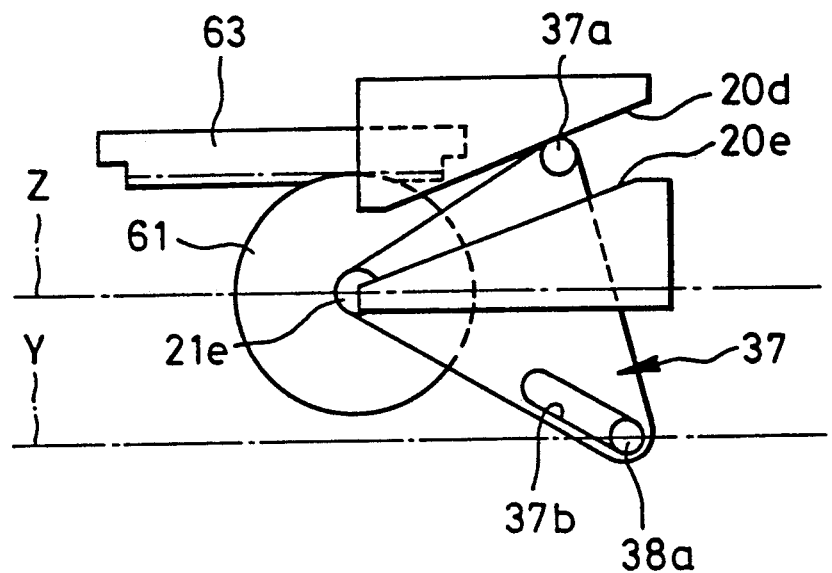
FIGS. 11A to 11D are diagrams explaining the operation of the cam mechanism for adjusting the position of the rear lens group.
Figure 11:
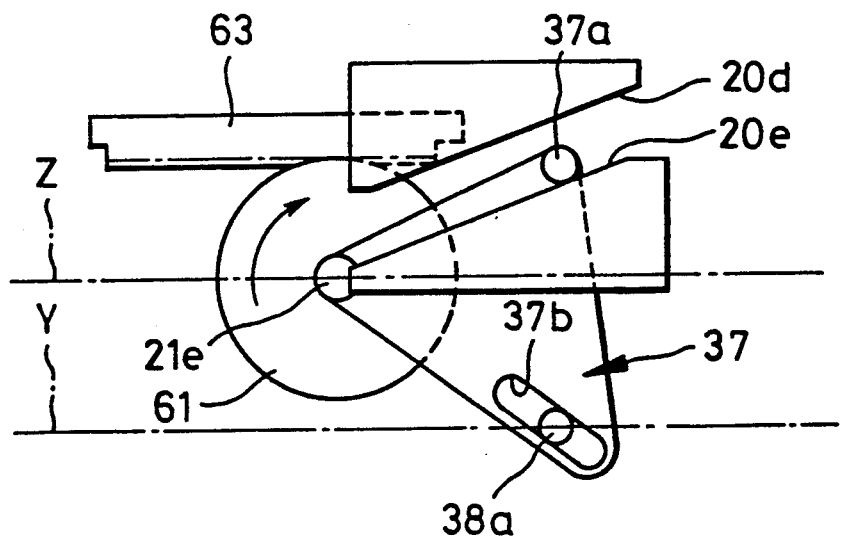

FIGS. 9 to 11 show another embodiment which compensates for a shift of focal point by using the rear lens group 31. Elements similar to those shown in FIGS. 1 to 3 are represented by using identical reference numerals. In this embodiment, the spring 39 is not necessary so that the load on the focussing motor 35 can be reduced.

Referring to FIG. 9, fixed to the inner wall of the stationary barrel 20 are two cam plates having cam surfaces 20d and 20e formed at their end faces. These cam surfaces 20d and 20e are spaced apart by a predetermined distance, and a cam follower pin 37a of the actuating lever 37 is inserted therebetween. The cam surface 20d guides the cam follower pin 37a to determine the position of the rear lens group 31 as the movable lens barrel 21 moves from the telephoto end position to the wide-angle end position along the optical axis. The cam surface 20e guides the cam follower pin 37a to determine the position of the rear lens group 31 as the movable lens barrel 21 moves from the wide-angle end position to the telephoto end position. In addition to the cam follower pin 37a, an elongated hole 37b is formed in the actuating lever 37. As shown in FIG. 10, the actuating lever 37 is rotatably mounted on the shaft 21e mounted on the outer surface of the movable lens barrel 21, via a spring 60, a pinion gear 61, and a friction clutch plate 62. It is to be noted that a roller may be fitted on the end of the cam follower pin 37a to reduce friction.

The pinion gear 61 meshes with a rack 63 mounted on the stationary barrel 20, and rotates as the movable lens barrel 21 moves. The spring 60 pushes against the pinion gear 61 to connect frictionally together the pinion gear 61, the friction clutch plate 62, and the actuating lever 37. The friction clutch plate 62 has a spring force of its own, acting in the direction of the axis of the shaft 21e, so that the rotation force of the pinion gear 61 is transmitted to the actuating lever 37 by frictional connection. Therefore, the friction clutch plate 62 causes the actuating lever 37 to rotate about the shaft 21e in accordance with the direction of rotation of the pinion ear 61, i.e., in accordance with the direction of movement of the movable lens barrel 21, thus to bring the cam follower pin 37a into contact with a selected one of the cam surfaces 20d and 20e. The friction clutch plate 62 has the same function of spring biasing the actuating lever 37 so as to maintain such a contact between the cam surface 20d or 20e and the cam follower pin 37a so as to guide the latter.

Next, the operation of this embodiment will be described with reference to FIGS. 11A to 11D. FIG. 11A illustrates the setting state of the movable lens barrel 21 when moving backward within the camera body 29 to the wide-angle end position. In this state, the cam follower pin 37a of the actuating lever 37 comes into contact with the cam surface 20d, and the pin 38a of the lens holder 38 contacts the rear end of the elongated hole 37b of the actuating lever 37. One-dot chain lines shown in FIG. 11A represent the directions of movement of the shaft 21e of the movable lens barrel 21 and the pin 38a of the lens holder 38, both of which are parallel to the optical axis P.

During zooming of the zoom lens unit from the wide-angle end position to the telephoto end position, as described previously, the movable lens barrel 21 emerges from the camera body 29 along the optical axis P and with it the front lens group 30 therein. As the movable lens barrel 21 moves forward, as shown in FIG. 11B, the pinion gear 61 meshing with the rack 63 rotates clockwise about the shaft 21e. The rotation force of the pinion gear 61 is transmitted via the friction clutch plate 62 to the actuating lever 37 to rotate it clockwise and to bring the cam follower pin 37a into contact with the cam surface 20e. As the movable lens barrel 21 moves further forward and the cam follower pin 37a moves along the cam surface 20e, the actuating lever 37 rotates while slipping on the friction clutch plate 62. As the actuating lever 37 rotates, the lens holder 38 holding the rear lens group 31 moves within the movable lens barrel 21 relative thereto, thereby to compensate for the positional deviation of the zoom lens optical system caused during zooming by backlash of the cam mechanism and gear train used for moving the movable lens barrel 21.

Figure 11C:
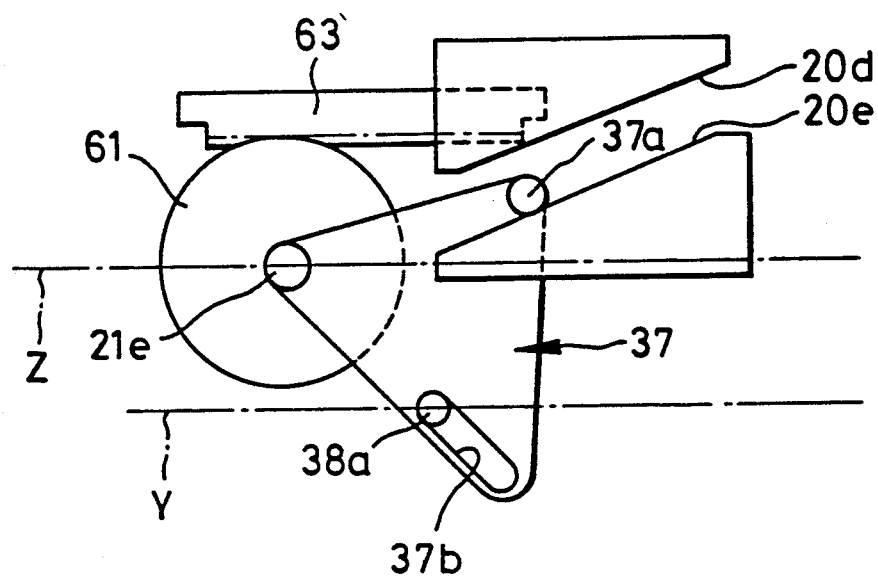
Figure 11D:
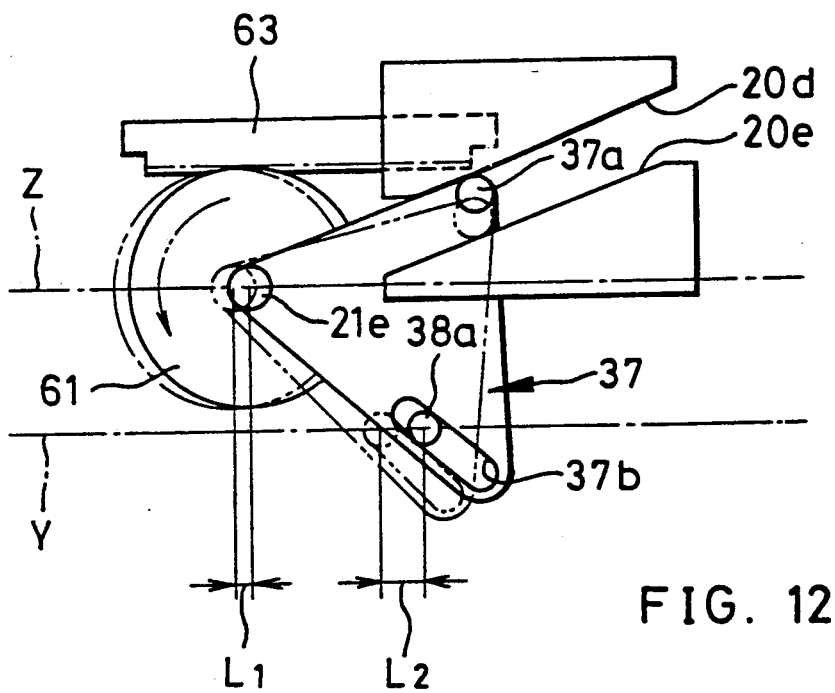

Continuous change of the focal length is performed by the movement of the movable lens barrel 21 to set the movable lens barrel 21 to a desired focal length. If zooming to the telephoto end position continues, the rotation force of the actuating lever 37 causes the pin 38a to move along the one-dot chain line Y and finally reach the telephoto end position as shown in FIG. 11C. During zooming from the telephoto end position to the wide-angle end position shown in FIG. 11A, the movable lens barrel 21 moves backward as shown in FIG. 11D, so that the pinion gear 61 rotates counterclockwise to turn the actuating lever 37 counterclockwise. As a result, the cam follower pin 37a is guided by the cam surface 20d.

As described above, the cam surface 20e guides the cam follower pin 37a during zooming from the wide-angle mode to the telephoto mode, and the cam surface 20d guides it during zooming from the telephoto mode to the wide-angle mode. Between the time the cam follower pin 37a departs from the cam surface 20d and the time it contacts the cam surface 20e, the shaft 21e moves by a distance L1 and the pin 38a moves by a distance L2. Therefore, the distance between the front lens group 30 and the rear lens group 31 becomes smaller by an amount (L2−L1) during zooming toward the telephoto mode than during zooming toward the wide-angle mode. In this manner, the shift of focal point of the zoom lens optical system by backlash of the movement mechanism of the movable lens barrel 21 is compensated by adjusting the position of the rear lens group 31. With this compensation, the front lens group 30 can be set to a desired lens position irrespective of the zooming direction, thereby focussing sharply a subject at a given subject distance.

In the above embodiment, the distance between the front lens group and the rear lens group is adjusted by a predetermined amount within the variable range of focal length, by setting the two cam surfaces 20d and 20e in parallel. The depth of field is greater in the wide-angle mode than in the telephoto mode of a zoom lens. Therefore, the amount of compensation of the distance between the front and rear lens groups may be changed with the focal length.

Figure 12:
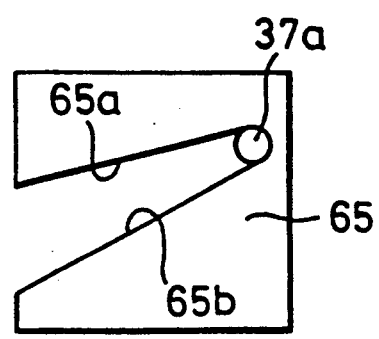
FIG. 12 is a plan view of a cam plate.
Figure 13:
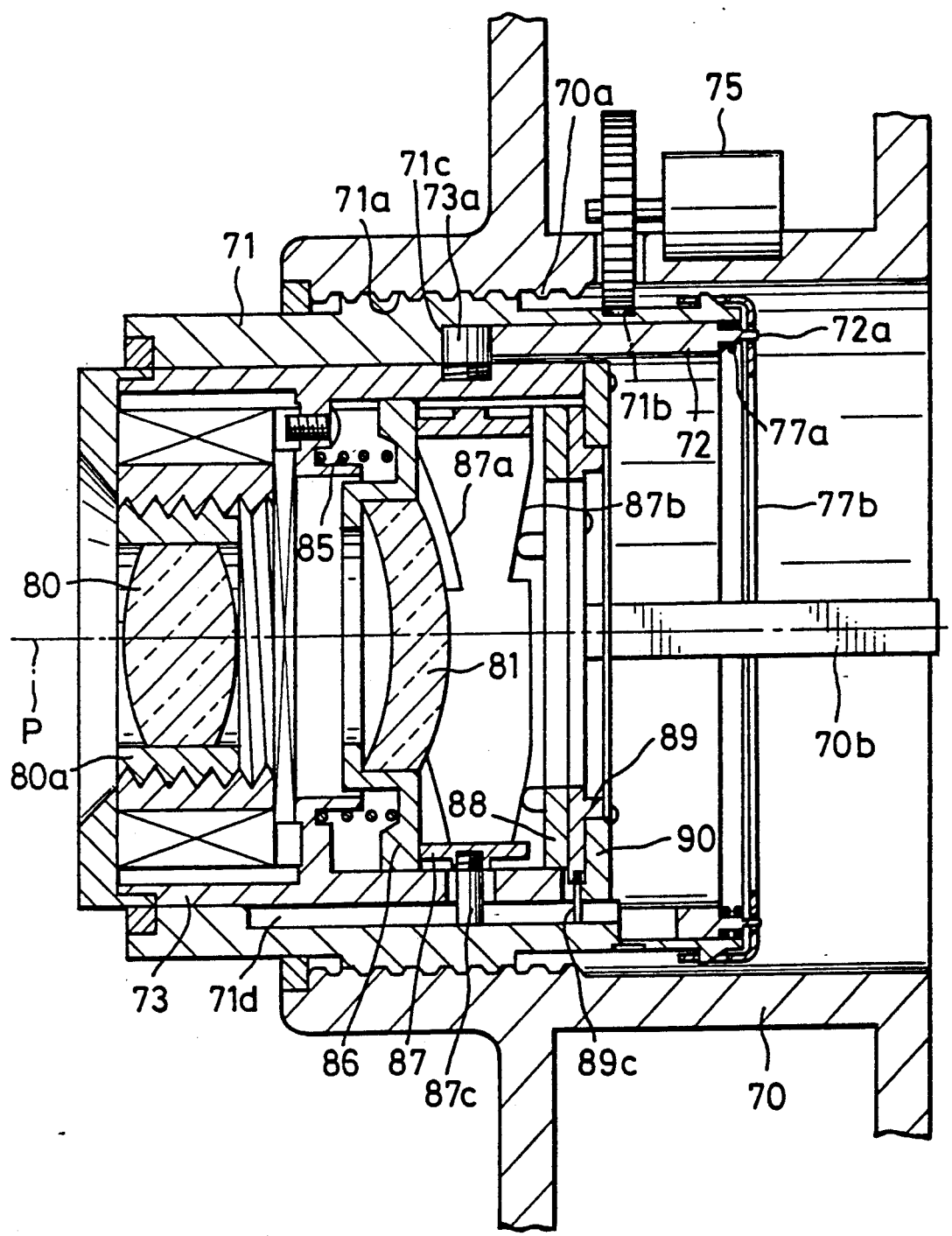
FIG. 13 is a cross sectional view of a zoom lens assembly according to another embodiment, wherein the position of the rear lens group is adjusting during zooming.

In an embodiment shown in FIG. 12, two cam surfaces 65a and 65b are provided on a cam plate 65. The distance between the cam surfaces 65a and 65b is greater for the wide-angle mode than for the telephoto mode, the compensation amount of the position of the rear lens group 31 reaching a maximum at the telephoto end position.

Figure 14:
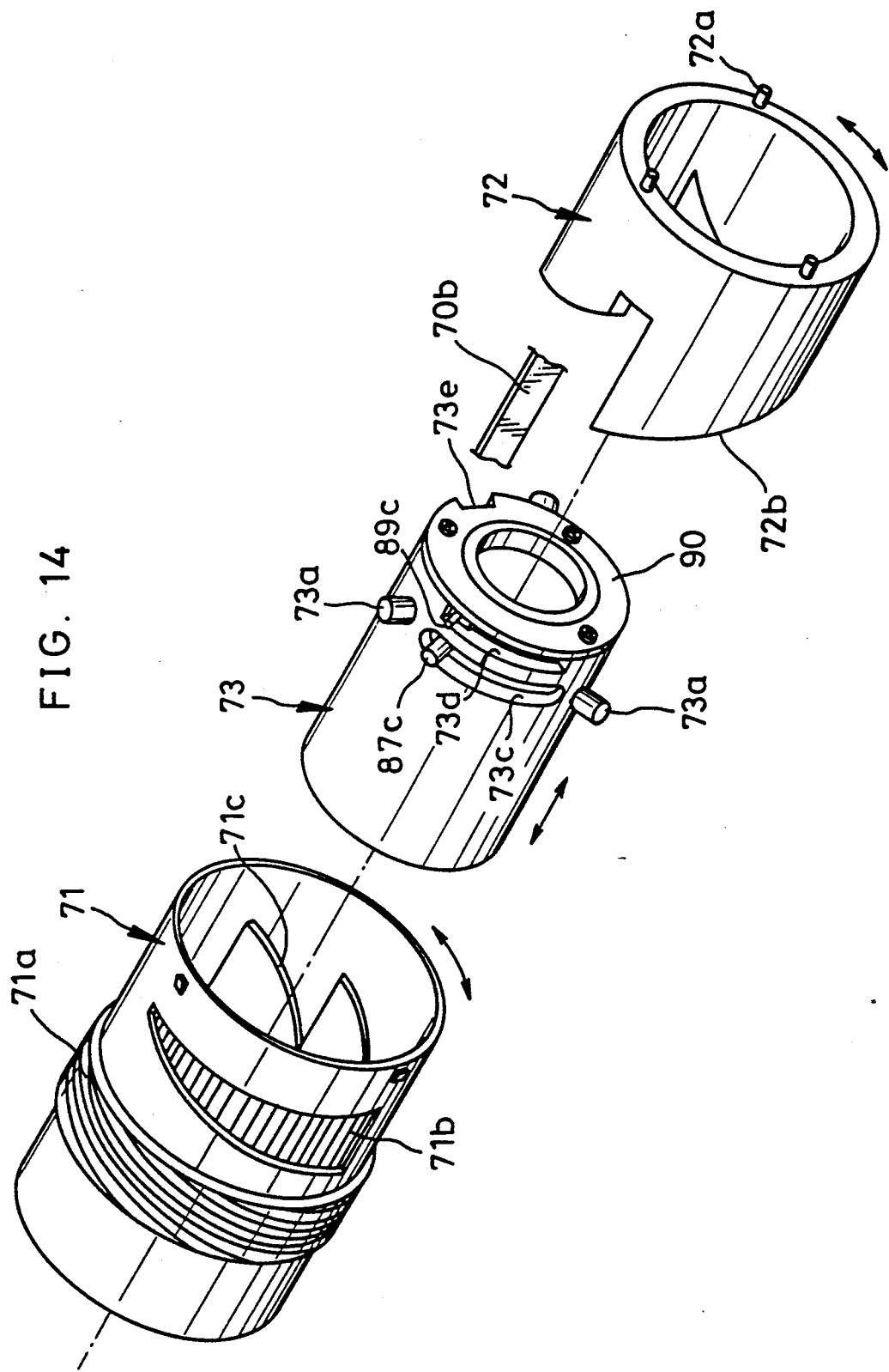
FIG. 14 is a fragmentary exploded perspective view of the zoom lens assembly shown in FIG. 13.

FIGS. 13 to 18 show another embodiment of a device for correcting the position of the rear lens group. The zoom lens assembly is comprised by a stationary barrel 70, a cam barrel 71, a cam driving ring 72, and a movable lens barrel 73. The cam barrel 71 and cam driving ring 72 are located within the stationary barrel 70. The movable lens barrel 73 is located within the cam barrel 71 and cam driving ring 72. During zooming, the cam barrel 71 and cam driving ring 72 move along the optical axis P while rotating. The movable lens barrel 73 moves linearly along the optical axis P within the cam barrel 71. The movable lens barrel 73 is therefore extended in two steps, obtaining a large amount of movement and a large zoom ratio without making the movable lens barrel long. Perspective views of the cam barrel 71, cam driving ring 72 and movable lens barrel 73 are shown in FIG. 14.

Figure 15:
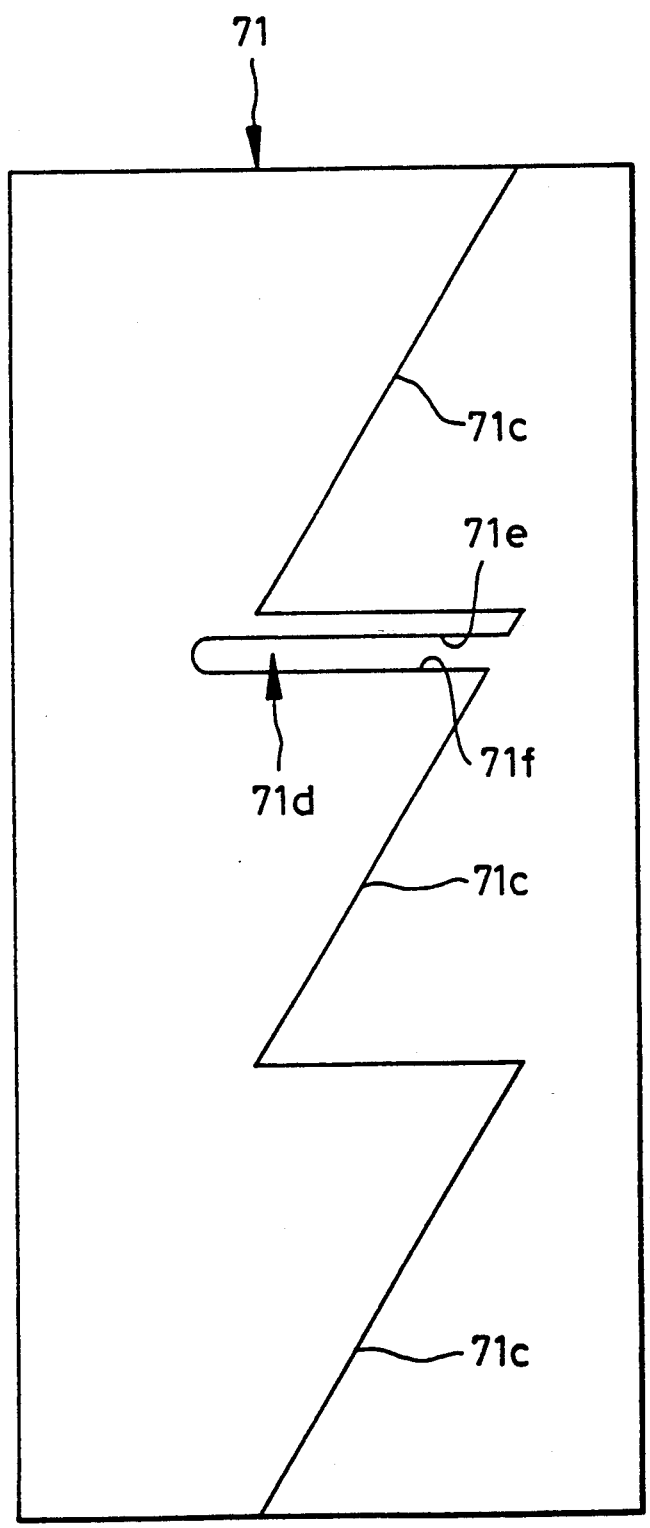
FIG. 15 is a developed view of the cam barrel.

Formed on the outer periphery of the cam barrel 71 are a male helicoidal thread 71a and a gear 71b, the male helicoidal thread 71a meshing with a female helicoidal thread 70a formed on the inner periphery of the stationary barrel 70. As the gear 71b is driven by the zooming motor 75, the cam barrel 71 moves forward and backward along the optical axis between the telephoto end position and the wide-angle end position while rotating, by being guided by the male helicoidal thread 71a. As shown in FIG. 15, formed on the inner periphery of the cam barrel 71 are three cam surfaces 71c for moving the movable lens barrel 73 along the optical axis, and a guide groove 71d parallel to the optical axis P for moving the rear lens group 81 within the movable lens barrel 73. The guide groove 71d has one side edge 71e contacting an actuating pin 87c and an adjusting pin 89c during the time the cam barrel 71 rotates toward the telephoto side, and another side edge 71f contacting the actuating pin 87c and the adjusting pin 89c during the time the cam barrel 71 rotates toward the wide-angle side.

The movable lens barrel 73 has three cam follower pins 73a on its outer periphery, the cam follower pins 73a being inserted into the cam barrel 71 to contact the cam surfaces 71c. Thereafter, the cam driving ring 72 is inserted into the cam barrel 71. In order to hold the cam driving ring 72 in the cam barrel 71, a cap 77b is mounted at the rear end of the cam barrel 71. The cap 77b has three holes formed therein to receive three pins 72a on the rear end of the cam driving ring 72. The three pins 72a are provided with springs 77a to urge the cam driving ring 72 toward the cam follower pins 73a which are thus gripped between the cam surfaces 71c and the front end 72b of the cam driving ring 72. Formed in the outer periphery of the movable lens barrel 73 is a recess 73e extending in the optical axis direction into which a guide plate 70b mounted on the stationary barrel 70 is fitted. As the cam barrel 71 is rotated by the zooming motor 75, the movable lens barrel 73 moves linearly along the optical axis P while being guide by the guide plate 70b and following the rotation of the cam surfaces 71c.

Figure 16:
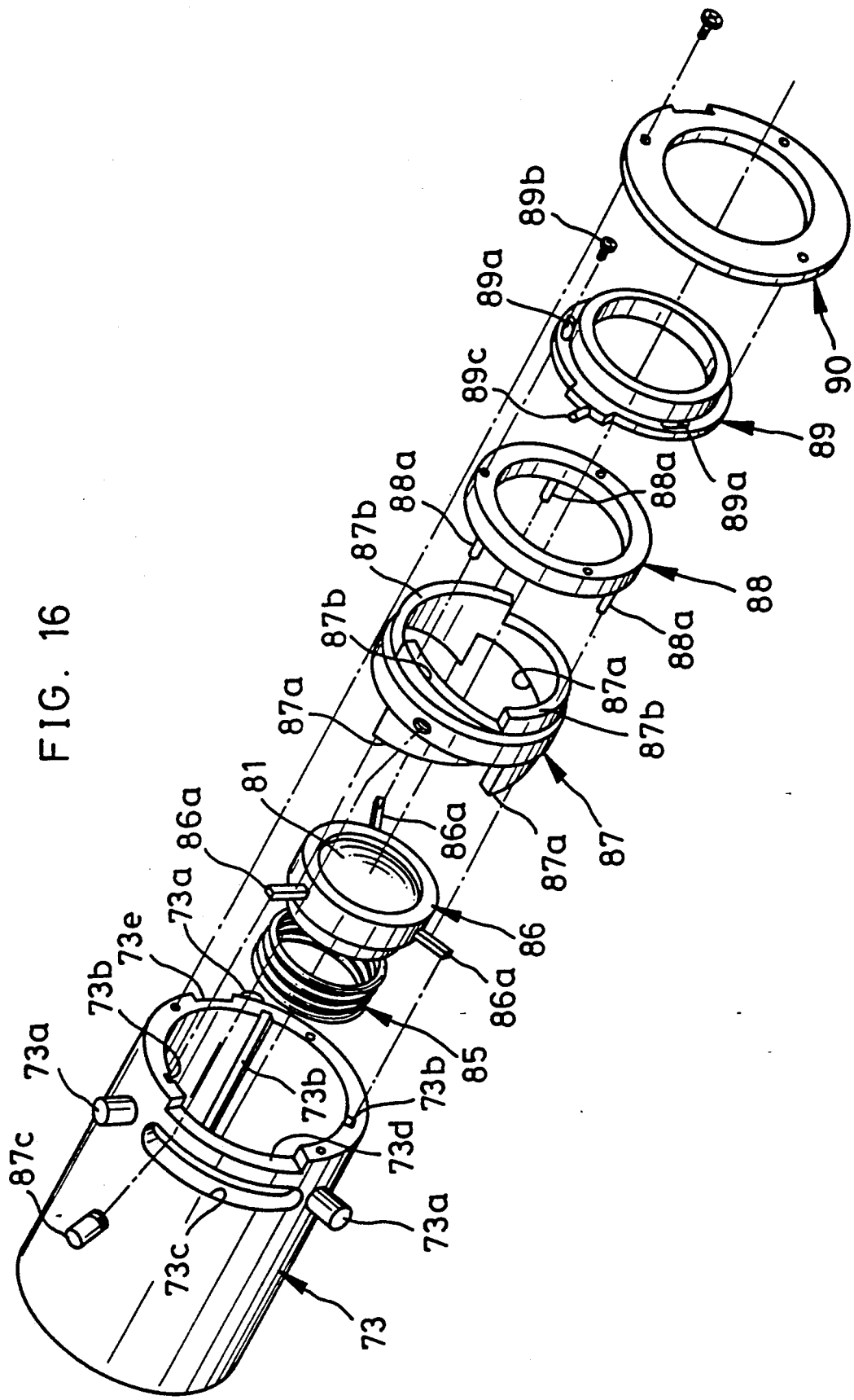
FIG. 16 is a fragmentary exploded perspective view of the movable lens barrel shown in FIG. 13.

The movable lens barrel 73 houses therein a front lens group 80 and a rear lens group 81 constituting the zoom lens optical system. A lens holder 80a holding the front lens group 80 is threaded with the movable lens barrel 73 and moves along the optical axis P during focussing while rotating. As shown in FIG. 16, at the rear end of the movable lens barrel 73, a coil spring 85, a lens holder 86 holding the rear lens group 81, a double cam ring 87, a support ring 88, an adjusting ring 89, and a fixed ring 90 are assembled in that order. Three pins 86a are mounted on the outer periphery of the lens holder 86 and are received in straight grooves 73b formed on the inner surface of the movable lens barrel 73 parallel to the optical axis so that the lens holder 86 can move linearly along the straight grooves 73b.

After housing the double cam ring 87 in the movable lens barrel 73, the actuating pin 87c is fixed to the double cam ring 87 via a wide through-hole 73c formed in the movable lens barrel 73. The distal end of the actuating pin 87c projecting from the through-hole 73c enters the guide groove 71d. As the cam barrel 71 rotates, the double cam ring 87 rotates together with the cam barrel 71 thanks to the guide groove 71d and the actuating pin 87c. The double cam ring 87 has three cam surfaces 87a formed on the forward side, and three tracking adjusting cam surfaces 87b formed on the rear side. The three cam surfaces 87a contact the three pins 86a to move the lens holder 86 against the action of the coil spring 85 so as to adjust the position of lens holder 86 in the direction of the optical axis P. The three tracking adjusting cam surfaces 87b contact three pins 88a on the support ring 88 to adjust the position of the double cam ring 87 in the direction of the optical axis P. Each tracking cam surface 87b has a linear slope opposite in inclination to that of the cam surfaces 87a. During zooming, as the double cam ring 87 rotates together with the cam barrel 71, the lens holder 86 moves linearly in the direction of the optical axis P thanks to the tracking adjusting cam surfaces 87b and cam surfaces 87a to determine the position of the rear lens group 81.

The adjusting ring 89 is fixed to the rear of the support ring 88 by means of adjusting screws 89b passing through elongated holes 89a. By rotating the adjusting ring 89 within the range of the elongated holes 89a, it is possible to change the fixed rotated position of the adjusting ring 89 relative to the support ring 88. An adjusting pin 89c is mounted on the outer surface of the adjusting ring 89, and the pin 89c passes through a recess 73d of the cam barrel 73 into the guide groove 71d of the cam barrel 71. Since the diameter of the adjusting pin 89c is smaller than that of the actuating pin 89c, it does not contact both sides 71e and 71f of the guide groove 71d immediately upon reversing the rotation direction of the cam barrel 71. At this time, the adjusting ring 89 does not rotate, but only the double cam ring 87 rotates with the cam barrel 71. Displacement of the contact positions between the pins 88a and tracking adjusting cam surfaces 87b causes a corresponding motion of the double cam ring 87 along the optical axis. The fixed ring 90 is fixed on the rear of the movable lens barrel 73 by means of screws to prevent each ring from being dismounted from the assembly.

In assembling the zoom lens device, the optical axis of the zoom lens optical system is first adjusted. Thereafter, the cam barrel 71 is set to the wide-angle end position or telephoto end position, and the position of the rear lens group 81 relative to the front lens group 80 is determined. The positioning of the rear lens group 81 is hereinafter referred to as a tracking adjustment. With this tracking adjustment, the support ring 88 is rotated within the range of the elongated holes 89a upon loosening the adjustment screws 89b. In this manner, in the wide-angle end position or telephoto end position of the cam barrel 71, the contact positions between the pins 88a and tracking adjusting cam surfaces 87b determine the position of the rear lens group 81 relative to the front lens group 80. Since the slopes of the cam surfaces 87a and tracking adjusting cam surfaces 87b are opposite, it is possible to rotate the lens holder 26 over a wider range as the support ring 88 rotates.

Figure 18:
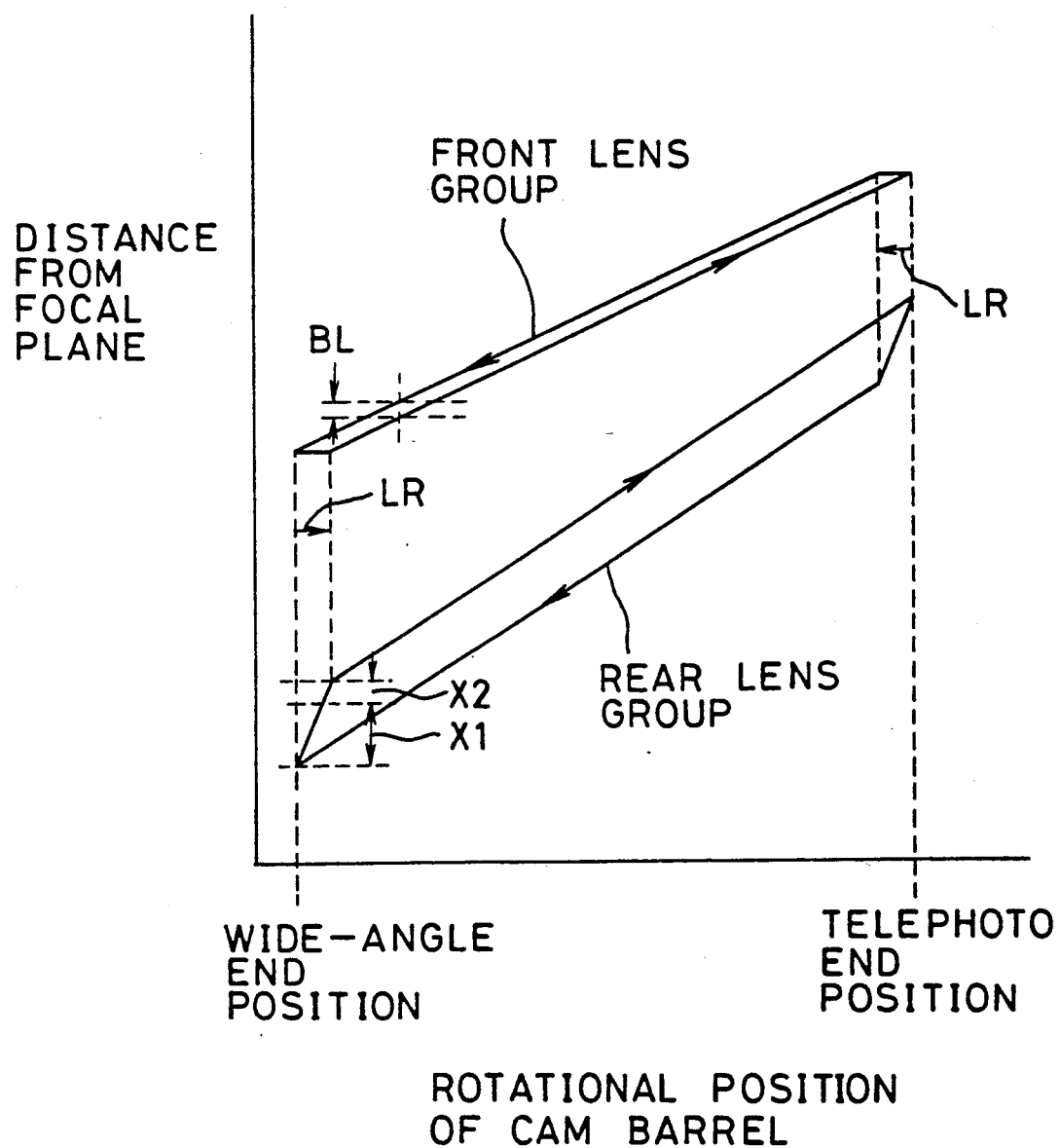
FIG. 18 is a graph showing the relation between the lens positions of the front and rear lens groups.

The operation of this embodiment will be described as follows: during zooming, the zooming motor 75 causes the cam barrel 71 to rotate within the stationary barrel 70 and to emerge from the camera body along the optical axis P. The rotation force of the cam barrel 71 is transmitted via the cam mechanism constituted by the cam surfaces 71c and cam follower pins 73a to the movable lens barrel 73 which in turn moves linearly along the optical axis P within the cam barrel 71. As in the embodiment described previously, the front lens group 80 moves together with the movable lens barrel 73, and the rear lens group 81 moves within the movable lens barrel 73 relative to the front lens group 80. FIG. 18 shows the relation between the rotational position of the cam barrel 71 relative to the distances from the image focussing plane (photographic film surface) to the front lens group 80 and rear lens group 81.

As is shown in FIG. 18, the distance of the front lens group 80 from the image focussing plane differs between the case wherein the cam barrel 71 rotates in the direction from the wide-angle end position to the telephoto end position, and the opposite case. More particularly, immediately after the zooming direction is changed, even if the cam barrel 71 rotates by an amount LR, the front lens group 80 will not move along the optical axis because of backlash of the stationary barrel 70, cam barrel 71, and movable lens barrel 73. Even if the rotational position of the cam ring 71 is the same, this backlash of the zooming mechanism changes the home position of the front lens group 80 as measured from the image focussing plane by a distance BL, whereby the camera is unable to provide proper focussing as described previously. The position of the rear lens group 81 also changes by the distance BL, causing an out-of-focus state.

Figure 17A:
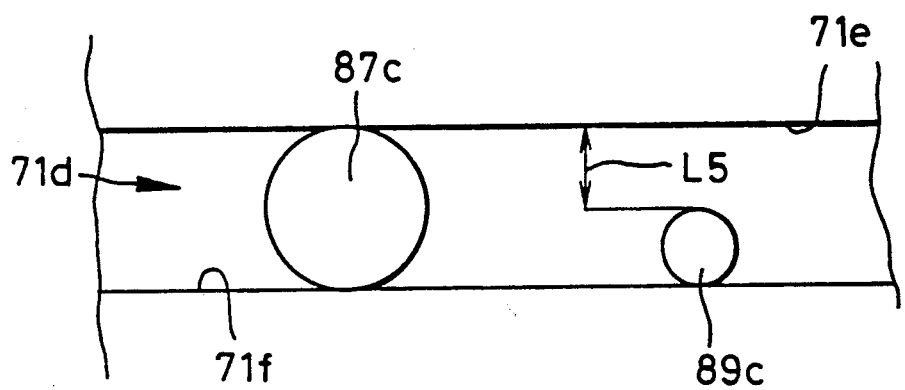
FIG. 17A shows the relation between the cam groove and the adjusting pin during zooming from telephoto to wide-angle.
Figure 17B:
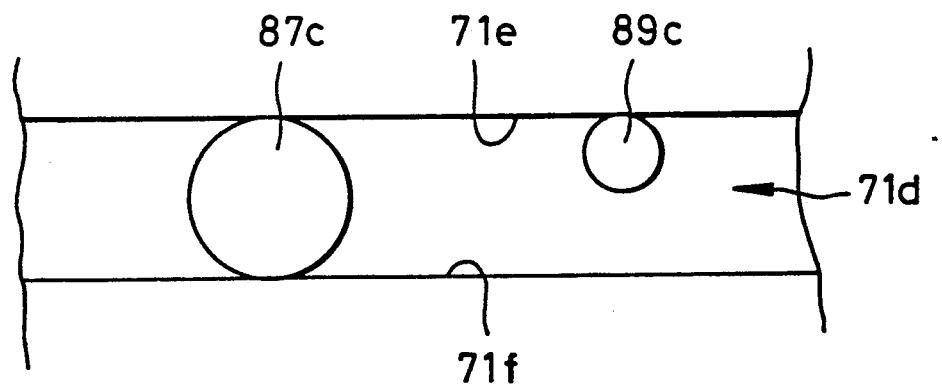
FIG. 17B shows the relation between the cam groove and adjusting pin during zooming from wide-angle to telephoto.

The influence of backlash of the zooming mechanism can be compensated by adjusting the position of the rear lens group 81 in accordance with the zooming direction. For this compensation purpose, as shown in FIGS. 17A and 17B, the actuating pin 87c fits in the guide groove 71d without any play, but the adjusting pin 89c fits in the guide groove 71d with a play of a circumferential distance L5 corresponding to the amount of rotation LR. FIG. 17A illustrates the case of zooming from the telephoto mode and stopping in the wide-angle end position. For example, in the case of zooming from the wide-angle end position to the telephoto end position, although the double cam ring 87 rotates together with the cam barrel 71, the supporting ring 88 and adjusting ring 89 remain stationary while the cam barrel 71 rotates by the rotation amount LR. As a result, immediately after the zooming direction is changed, the double cam ring 87 rotates relative to the support ring 88 and moves along the optical axis P by a distance X1 thanks to the tracking adjusting cam surfaces 87b and pins 88a. At this time, the cam surfaces, 87a of the double cam ring 87 cause the lens holder 86 to move along the optical axis P by a distance X2. Therefore, while the cam barrel 71 rotates by the amount LR, the lens holder 86 moves along the optical axis P by distance (X1+X2). The amount of movement X1 compensates for the shift of focal point of the zoom lens optical system caused by backlash of the zooming mechanism.

After the cam barrel 71 rotates by the amount LR corresponding to the circumferential distance L5, the side 71e pushes the adjusting pin 89c so that the adjusting ring 89 starts rotating with the support ring 88 as shown in FIG. 17B. During the time the support ring 88 rotates together with the double cam ring 87, the tracking adjusting cam mechanism will not operate so that the double cam ring 87 will not move along the optical axis P. Thus, the lens holder 86 moves along the optical axis P thanks only to the cam surfaces 87a of the double cam ring 87.

The rear lens group 81 eventually stops at the telephoto end position. In this case also, it has the conditions shown in FIG. 17B. Also during zooming from the telephoto end position to the wide-angle end position, during the time the cam ring 71 rotates by the amount LR, only the double cam ring 87 rotates. In this case, it moves rearward by the distance (X1+X2) along the optical axis P. After the cam ring 71 rotates by the amount LR, the other side 71f pushes the adjusting pin 89c as shown in FIG. 17A, so that the cam surfaces 87a of the double cam ring 87 cause the lens holder 86 to move rearward along the optical axis P.

After the zoom lens optical system is set to a desired zooming position, the focussing motor causes the front lens group 80 to be set to a lens position corresponding to the subject distance, as described previously. Also in this embodiment, one of the two zooming directions undergoes focussing adjustment to correct the position of the rear lens group 81 by means of the double cam ring 87, thereby providing proper focussing by eliminating the influence of backlash of the zooming mechanism. In each embodiment described above, for the purpose of convenience, the distance between the front and rear lens groups is assumed to change linearly with the focal length.

In the above embodiments, the zoom lens optical system is constructed of two groups including the front and rear lens groups. The present invention is applicable to a three-group system having a focussing lens group, variator lens group and compensator lens group, or to a four-group system. Furthermore, each lens group may comprise, instead of a plurality of lenses, a single lens. The movable lens barrel may be moved along the optical axis by means of a helicoidal mechanism, to set the front lens group to a focussing position by means of a cam mechanism. If a stepping motor is used as the zooming motor or focussing motor, a rotary encoder is not necessary, because pulses supplied to the stepping motor can be used to detect the amount of rotation by counting them.

Various changes and modifications to the illustrated embodiments described above will be apparent to those skilled in the art. These changes and modifications can be made without departing from the spirit and the scope of the invention and without diminishing its attendant advantages. It is therefore intended that such changes and modifications be covered by the following claims.

What is claimed is:

1. A zoom lens device having a movable lens barrel movable in first and second directions along an optical axis between a wide-angle end position and a telephoto end position, and a zoom lens optical system supported by said movable lens barrel, said zoom lens device comprising:
    first signal generating means for generating a first signal representing the direction of movement of said movable lens barrel;
    second signal generating means for generating a second signal representing the amount of movement of said movable lens barrel;
    third signal generating means for generating a third signal representing a lens position of a focussing lens of said zoom lens optical system, in accordance with said first and second signals and a signal representing subject distance; and
    means for setting said focussing lens to said lens position in accordance with said third signal during focussing.

2. A zoom lens device according to claim 1, wherein said zoom lens system includes at least a first lens group and a second lens group, said first lens group comprising said focussing lens, said first and second lens groups moving during zooming, and only said first lens group moving during focussing.

3. A zoom lens device according to claim 2, wherein during zooming said first lens group moves together with said movable lens barrel, and said second lens group moves relative to said movable lens barrel within said movable lens barrel.

4. A zoom lens device according to claim 2, further comprising a zooming motor for moving said movable lens barrel along said optical axis during zooming, a focussing motor for moving said first lens group along said optical axis during focussing, and rangefinding means for measuring said subject distance.

5. A zoom lens device according to claim 4, wherein said zooming motor is a rotary motor and said first signal generating means includes a first rotary encoder for detecting the amount of rotation of said zooming motor, and said second signal generating means includes a zooming operation switch for designating the onset and direction of rotation of said zooming motor.

6. A zoom lens device according to claim 5, wherein said zooming operation switch has two fixed contacts corresponding each to a different rotation direction of said zooming motor and a movable contact segment adapted to be connected to one of said two fixed contacts to be operated during said zooming.

7. A zoom lens device according to claim 5, wherein said focussing motor is a rotary motor and further comprising a second rotary encoder for detecting the amount of rotation of said focussing motor to determine whether said first lens group has been set to said optimum lens position.

8. A zoom lens device according to claim 2, wherein said movable lens barrel and said second lens group are linearly moved along said optical axis by a cam mechanism, and said first lens group is moved, while being rotated, along said optical axis by a helicoidal mechanism.

9. A zoom lens device according to claim 1, further comprising a memory for storing a first table for said first direction and a second table for said second direction, each of said first and second tables storing a plurality of signals representing focussing lens positions and an optimum one of the plurality of said lens position signals being selected in accordance with said second signal and said distance signal.

10. A zoom lens device having a first lens holder holding a first lens group, a second lens holder holding a second lens group, and a movable lens barrel containing said first and second lens holders in a manner allowing said first and second lens holders to be movable along an optical axis, said movable lens barrel being adapted to move in first and second directions along said optical axis between a wide-angle end position and a telephoto end position during zooming, and said first lens holder moving together with said movable lens barrel along said optical axis during zooming and moving along said optical axis within said movable barrel during focussing to be set to a position corresponding to subject distance, said zoom lens device comprising:
 a cam follower for moving said second lens holder along said optical axis;
 a first cam surface for guiding said cam follower when said movable lens barrel moves in said first direction and for moving said second lens holder along said optical axis within said movable lens barrel;
 a second cam surface for guiding said cam follower when said movable lens barrel moves in said second direction and for moving said second lens holder along said optical axis within said movable lens barrel; and
 switching means for bringing said cam follower into contact with one of said first and second cam surfaces when said movable lens barrel moves into said first direction and into contact with the other of said first and second cam surfaces when said movable lens barrel moves in said second direction.

11. A zoom lens device according to claim 10, further comprising a zooming motor for moving said movable lens barrel along said optical axis during zooming, a focussing motor for moving said first lens group along said optical axis during focussing, and rangefinding means for measuring said subject distance.

12. A zoom lens device according to claim 11, wherein said zooming motor is a rotary motor, and further comprising a zooming operation switching means to be operated during zooming for designating the onset and the direction of rotation of said zooming motor, said zooming operation switching means having two fixed contacts corresponding to the rotation direction of said zooming motor and a movable contact segment to be connected to one of said two fixed contacts to be operated during said zooming.

13. A zoom lens device according to claim 12, wherein said switching means comprises a lever swingably mounted on said movable lens barrel and having said cam follower, a pinion gear rotatably mounted on said movable lens barrel, a rack disposed in the direction of movement of said movable lens barrel for rotating said pinion gear, a friction clutch member for coupling said pinion gear to said lever through a friction force therebetween, and a coupling pin fixed to said second lens holder and coupled to said lever.

14. A zoom lens device according to claim 13, wherein said pinion gear and said lever are rotatably mounted on a common shaft.

15. A zoom lens device according to claim 13, wherein said coupling pin is formed on said movable lens barrel, said coupling pin passing through a straight groove extending along said optical axis, and a distal end of said coupling pin being disposed in an elongated hole formed in said lever.

16. A zoom lens device according to claim 10, wherein said movable lens barrel linearly moves along said optical axis by means of a cam mechanism, and said first lens holder moves, while rotating, along said optical axis by means of a helicoidal mechanism.

17. A zoom lens device according to claim 10, wherein said first and second cam surfaces are parallel and are spaced apart by a predetermined distance.

18. A zoom lens device according to claim 17, wherein the distance between said first and second cam surfaces is greater in said telephoto end position than in said wide-angle end position.

19. A zoom lens device having a first lens holder holding a first lens group, a second lens holder holding a second lens group, and a movable lens barrel containing said first and second lens holders for movement of said first and second lens holders along an optical axis, said movable lens barrel moving in first and second opposite directions along said optical axis between a wide-angle end position and a telephoto end position during zooming, and said first lens holder moving together with said movable lens barrel along said optical axis during zooming and moving along said optical axis within said movable barrel during focussing to a position corresponding to a subject distance, said zoom lens device comprising:
 a cam follower pin mounted on said second lens holder;
 a cam ring guiding said cam follower pin, said cam ring being housed rotatably and slidably within said movable lens barrel, and rotating during zooming to move said second lens holder along said optical axis;
 first means for moving said cam ring along said optical axis by a predetermined distance only immediately after a change in direction of movement of said movable lens barrel; and
 means biasing said second lens holder toward said cam ring.

20. A zoom lens device according to claim 19, further comprising a zooming motor for moving said movable lens barrel along said optical axis during zooming, a focussing motor for moving said first lens group along said optical axis during focussing, and rangefinding means for measuring said subject distance.

21. A zoom lens device according to claim 20, wherein said zooming motor is a rotary motor, and further comprising a zooming operation switch for designating the onset and the direction of rotation of said zooming motor, said zooming operation switch having two fixed contacts corresponding to the rotation direction of said zooming motor land a movable contact segment to be operated during said zooming to be connected to one of said two fixed contacts.

22. A zoom lens device according to claim 19, further comprising a cam barrel containing said movable lens barrel, said cam barrel moving, while rotating, along said optical axis during zooming, and causing said movable lens barrel to move linearly within said cam barrel along said optical axis.

23. A zoom lens device according to claim 22, wherein said cam ring has a coupling pin passing through said movable lens barrel, a distal end of said coupling pin being disposed in a guide groove formed in said cam barrel, said guide groove extending along said optical axis and having a width equal to the diameter of said coupling pin to allow said cam ring to rotate together with said cam barrel.

24. A zoom lens device according to claim 23, further comprising an adjusting pin for allowing said support ring to rotate, the diameter of said adjusting pin being smaller than the width of said guide groove so as to allow said adjusting pin to selectively contact either one of but not simultaneously the two sides of said guide groove.

25. A zoom lens device according to claim 24, further comprising an adjusting ring fixed to said support ring, said adjusting pin being mounted on said adjusting ring.

26. A zoom lens device according to claim 25, wherein said adjusting ring is adapted to undergo an infinity focus adjustment to adjust the mounting position of said adjusting ring on said support ring.

27. A zoom lens device according to claim 19, wherein first and second cam surfaces are formed on opposite sides of said cam ring, said first cam surface being in contact with said cam follower pin, and said second cam surface being in contact with part of a support ring rotatable relative to said cam ring.

28. A zoom lens device according to claim 19, wherein said movable lens barrel linearly moves along said optical axis by means of a cam mechanism, and said first lens holder moves, while rotating, along said optical axis by means of a helicoidal mechanism.

* * * * *